United States Patent
Ebert et al.

(10) Patent No.: US 6,991,235 B2
(45) Date of Patent: Jan. 31, 2006

(54) GAS-BUFFERED SEAL ASSEMBLY AND METHOD THEREFOR

(75) Inventors: Stephan J. Ebert, Thousand Oaks, CA (US); James D. Goss, Burbank, CA (US); Neil G. Hicks, Chuluota, FL (US); Scott E. McVey, Newbury Park, CA (US); Jozsef L. Moharos, Northridge, CA (US); Dean J. Nunez, Sherman Oaks, CA (US)

(73) Assignee: The Boeing Company, Chicago, IL (US)

( * ) Notice: Subject to any disclaimer, the term of this patent is extended or adjusted under 35 U.S.C. 154(b) by 132 days.

(21) Appl. No.: 10/703,776

(22) Filed: Nov. 7, 2003

(65) Prior Publication Data

US 2005/0098958 A1    May 12, 2005

(51) Int. Cl.
*F16J 15/44* (2006.01)
*F16J 15/40* (2006.01)
(52) U.S. Cl. ........................... 277/355; 277/431
(58) Field of Classification Search ................ 277/355, 277/408, 431, 432
See application file for complete search history.

(56) References Cited

U.S. PATENT DOCUMENTS

| | | | | |
|---|---|---|---|---|
| 3,392,910 A | * | 7/1968 | Tanzberger | 415/111 |
| 4,078,809 A | * | 3/1978 | Garrick et al. | 277/304 |
| 4,156,342 A | * | 5/1979 | Korta et al. | 60/39.08 |
| 4,193,603 A | * | 3/1980 | Sood | 277/304 |
| 4,924,817 A | * | 5/1990 | Seelen | 122/379 |
| 5,454,689 A | * | 10/1995 | Falavigna | 415/112 |
| 5,597,167 A | * | 1/1997 | Snyder et al. | 277/355 |
| 6,131,910 A | * | 10/2000 | Bagepalli et al. | 277/355 |
| 6,244,599 B1 | * | 6/2001 | Braun et al. | 277/352 |
| 6,330,790 B1 | * | 12/2001 | Arora et al. | 60/39.08 |
| 6,402,157 B1 | * | 6/2002 | Zhou et al. | 277/355 |
| 6,416,057 B1 | * | 7/2002 | Adams et al. | 277/355 |

* cited by examiner

*Primary Examiner*—Alison K. Pickard
(74) *Attorney, Agent, or Firm*—Alston & Bird LLP

(57) ABSTRACT

A gas-buffered brush seal assembly and associated method are provided. The seal assembly includes at least one brush seal that defines an interface with a rotatable member. The seal assembly is configured to deliver a gas to the interface so that the gas at least partially prevents the flow of a fluid therethrough. In addition, the seal assembly can be adjustable so that the flow of the fluid is controlled by adjusting the flow rate of the gas through the seal assembly.

33 Claims, 7 Drawing Sheets

GAS-BUFFERED SEAL ASSEMBLY AND METHOD THEREFOR

FIELD OF THE INVENTION

This invention relates to seal assemblies and, in particular, to a gas-buffered seal assembly for selectively restricting the flow of a fluid through an interface.

BACKGROUND OF THE INVENTION

Various applications require the formation of a seal between adjacent components such that the seal prevents the flow of fluids between the components. In some cases, the seals are configured to completely prevent the flow of fluid, while in other cases it is desirable to have a small amount of fluid flow through the seal. Further, some applications require a complete seal at certain times and a partial seal at other times so that the flow of the fluid can be selectively controlled. For example, FIG. 1 illustrates a conventional turbopump 10 for a rocket engine, such as the high pressure fuel turbopump for the space shuttle main engine available from the Rocketdyne division of The Boeing Company. The turbopump 10 includes a pump portion 12 and a turbine portion 16. A shaft 20, sometimes referred to as a "rotor," extends between the two portions 12, 16 to mechanically couple a pump 14 in the pump portion 12 to a turbine 18 in the turbine portion 16, so that the pump 14 can be rotatably actuated by the turbine 18.

During operation, the pump 14 is used to pump cold fluids such as liquid hydrogen or liquid oxygen, and thus the pump portion 12 typically operates at cryogenic temperatures. The dimensions of, and clearances between, components of the turbopump 10 can be affected by the temperature of the turbopump 10. Therefore, the pump portion 12 is typically chilled before operation of the engine is started. Such chilling can be accomplished by circulating a cryogenic fluid through the pump portion 12. The turbine portion 16, on the other hand, typically operates at high temperatures, e.g., 1000° F. or greater. It is generally undesirable to chill the turbine portion 16 before operation. Moreover, if the cryogenic fluid is combustible, it is generally undesirable for the fluid to leak into the turbine, which can increase a risk of fire. Therefore one or more seals 22, 24 are provided for preventing the cryogenic fluid from flowing from the pump portion 12 to the turbine portion 16 during the pre-operation chilling process. However, during operation of the turbopump 10, it is generally desirable for some of the fluid to leak from the pump portion 12, through the seals 22, 24, and into the turbine portion 16 so that the fluid cools the turbine portion 16.

The turbopump 10 shown in FIG. 1 includes seals 22, 24 for controlling the flow of the cryogenic fluid. In particular, a lift-off seal 22 and a labyrinth seal 24 are provided at various locations in the turbopump 10. Selective sealing between the pump and turbine portions 12, 16 of the turbopump 10 is achieved by the lift-off seal 22, which is actuated by the pressure of the cryogenic fluid. Typically, the lift-off seal 22, which extends circumferentially around the shaft 20, is disposed adjacent a shoulder 28 provided on the shaft 20 or on a sleeve 30 that is on the shaft 20. The lift-off seal 22 includes springs that bias a sealing surface of the lift-off seal 22 against the shoulder 28. When the pressure in the pump portion 12 is low, such as during the pre-operation chilling process, the springs maintain the sealing surface against the shoulder 28, thereby preventing the flow of fluid between the seal 22 and the shoulder 28. When the pressure in the pump portion 12 increases, such as during operation of the turbopump 10, the fluid overcomes the springs in the lift-off seal 22, pushing the sealing surface away from the shoulder 28 so that fluid can flow therebetween. However, due to the number of parts and complexity of the lift-off seal 22, such seals can fail and improperly prevent or provide fluid flow between the pump and turbine portions 12, 16. Failure of the seal 22 can result in improper or inefficient operation of the turbopump 10 or failure of the turbopump 10, thereby requiring maintenance, repair, or replacement of the turbopump components. Further, lift-off seals 22 are typically relatively large, requiring significant space in the turbopump 10.

Thus, there exists a need for an improved sealing assembly for turbopumps and other applications requiring a fluid seal. The sealing assembly should preferably provide a controllable seal so that a flow of fluid through the seal can be prevented according to a particular application or operational aspects of the application. In addition, the sealing assembly should preferably be reliable and not unnecessarily large or complex.

SUMMARY OF THE INVENTION

The present invention provides a gas-buffered brush seal assembly and a method therefor. The seal assembly includes at least one brush seal that defines an interface with a rotatable member. The seal assembly is configured to deliver a gas to the interface so that the gas at least partially prevents the flow of a fluid therethrough. The seal assembly can be adjustable so that flow of the fluid through the seal assembly can be controlled by adjusting the flow rate of the gas through the seal assembly.

According to one embodiment of the present invention, the seal assembly includes a housing that defines a bore for receiving the rotatable member. The brush seal, which is disposed in the housing, includes a circumferential member structured to extend circumferentially around the rotatable member. A plurality of elongate members are connected to the circumferential member and extend generally radially inward from the circumferential member to define a flow restricting interface with the rotatable member. A dispersion ring is also disposed in the housing. The dispersion ring defines a gas passage in fluid communication with a gas inlet defined by the housing. The dispersion ring is configured to receive a gas from the inlet of the housing, communicate the gas through the gas passage, and deliver the gas to the interface between the elongate members and the rotatable member so that the gas at least partially prevents the flow of fluid through the interface. The housing can define a drain for receiving the fluid and/or the gas.

The gas passage of the dispersion ring can be defined by a surface that is directed in the axial direction of the rotatable member and at least one wall member extending from the surface and extending circumferentially around the dispersion ring. The dispersion ring can define a first wall member at a first radial position on the surface and a second wall member at a second radial position on the surface radially inward of the first wall member. The first wall member can define one or more gaps for radial flow of the gas into the gas passage and the second wall member can define one or more gaps for radial flow of the gas radially inward from the gas passage. The housing can define an annular space proximate to the dispersion ring that is fluidly connected to the gas inlet so that the annular space can receive the gas from the gas inlet and deliver the gas to the dispersion ring. Further, the dispersion ring can be configured to deliver the gas to the interface at a substantially uniform pressure.

The brush seals can be provided on opposite sides of the dispersion ring, and the brush seals and the dispersion ring can be engaged to prevent relative rotation therebetween. Further, a backup ring can be disposed opposite the brush seal from the dispersion ring and structured to restrict the axial deformation of at least some of the elongate members.

The seal assembly can be configured to operate in first and second modes in which the gas is delivered at different flow rates. For example, the gas can be selectively delivered at a first flow rate so that flow of the fluid through the interface is substantially entirely prevented and a second, lesser flow rate so that the flow of the fluid through the interface occurs according to a predetermined rate.

The present invention also provides a method for controlling the flow of a fluid through a seal assembly. The method includes circulating a gas through the gas passage and axially through the at least one brush seal so that a flow of the fluid through the interface is prevented. The gas is circulated at a first flow rate so that the flow of the fluid is substantially prevented. Further, the gas can be circulated at a second flow rate so that the fluid flows according to a predetermined rate through the interface. The second flow rate of the gas, which is less than the first flow rate, can be zero so that the predetermined rate of flow of the fluid occurs when the circulation of the gas is terminated. According to one aspect of the invention, the gas is circulated radially inward into the dispersion ring, circumferentially through the gas passage of the dispersion ring, and thereafter axially through the interface. Brush seals can be provided on opposite sides of the dispersion ring so that the gas is circulated in opposite axial directions through the brush seals.

BRIEF DESCRIPTION OF THE DRAWINGS

The foregoing and other advantages and features of the invention, and the manner in which the same are accomplished, will become more readily apparent upon consideration of the following detailed description of the invention taken in conjunction with the accompanying drawings, which illustrate preferred and exemplary embodiments, but which are not necessarily drawn to scale, wherein.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
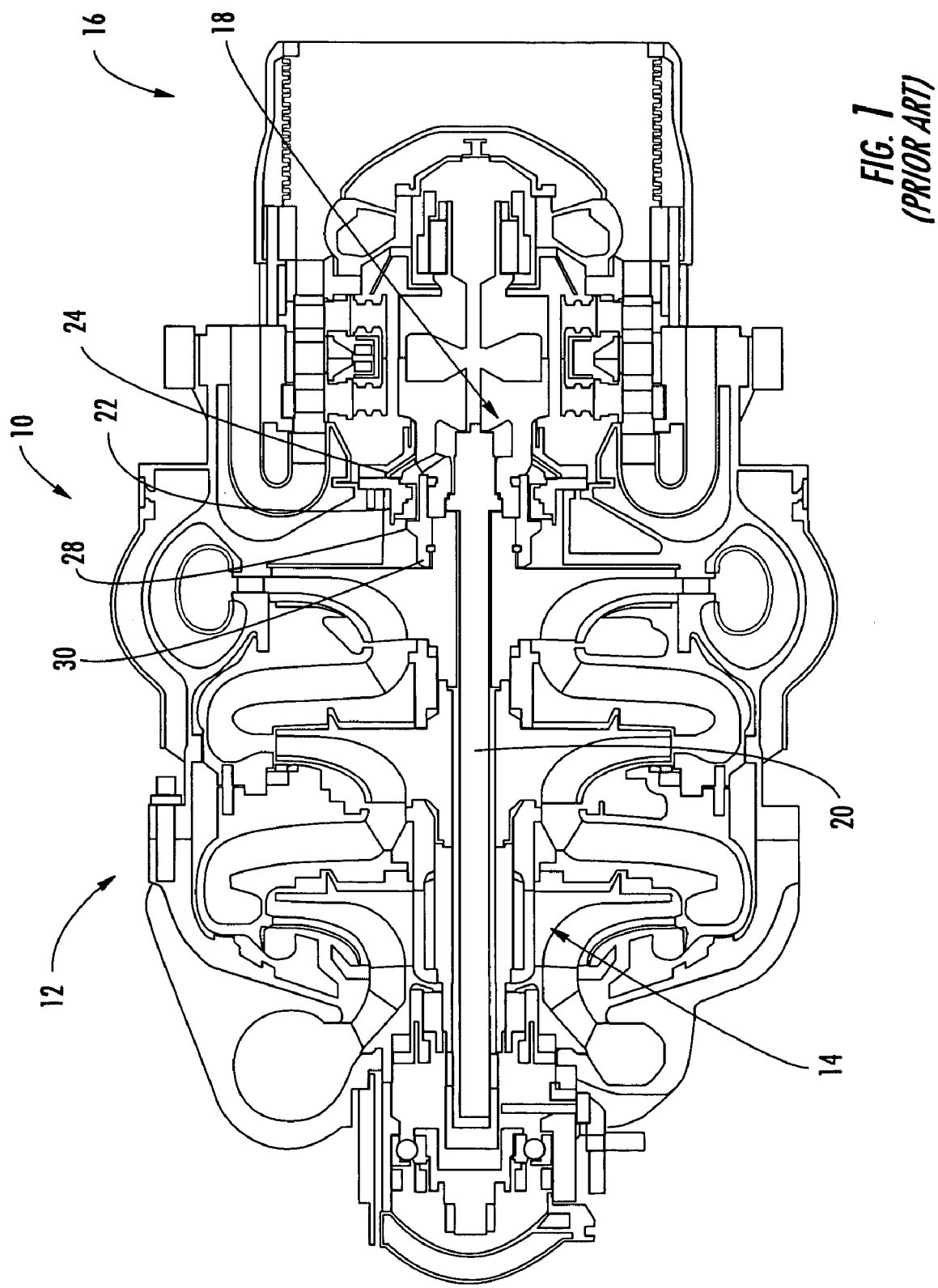
FIG. 1 is section view illustrating a conventional turbopump for a rocket engine.
Figure 2:
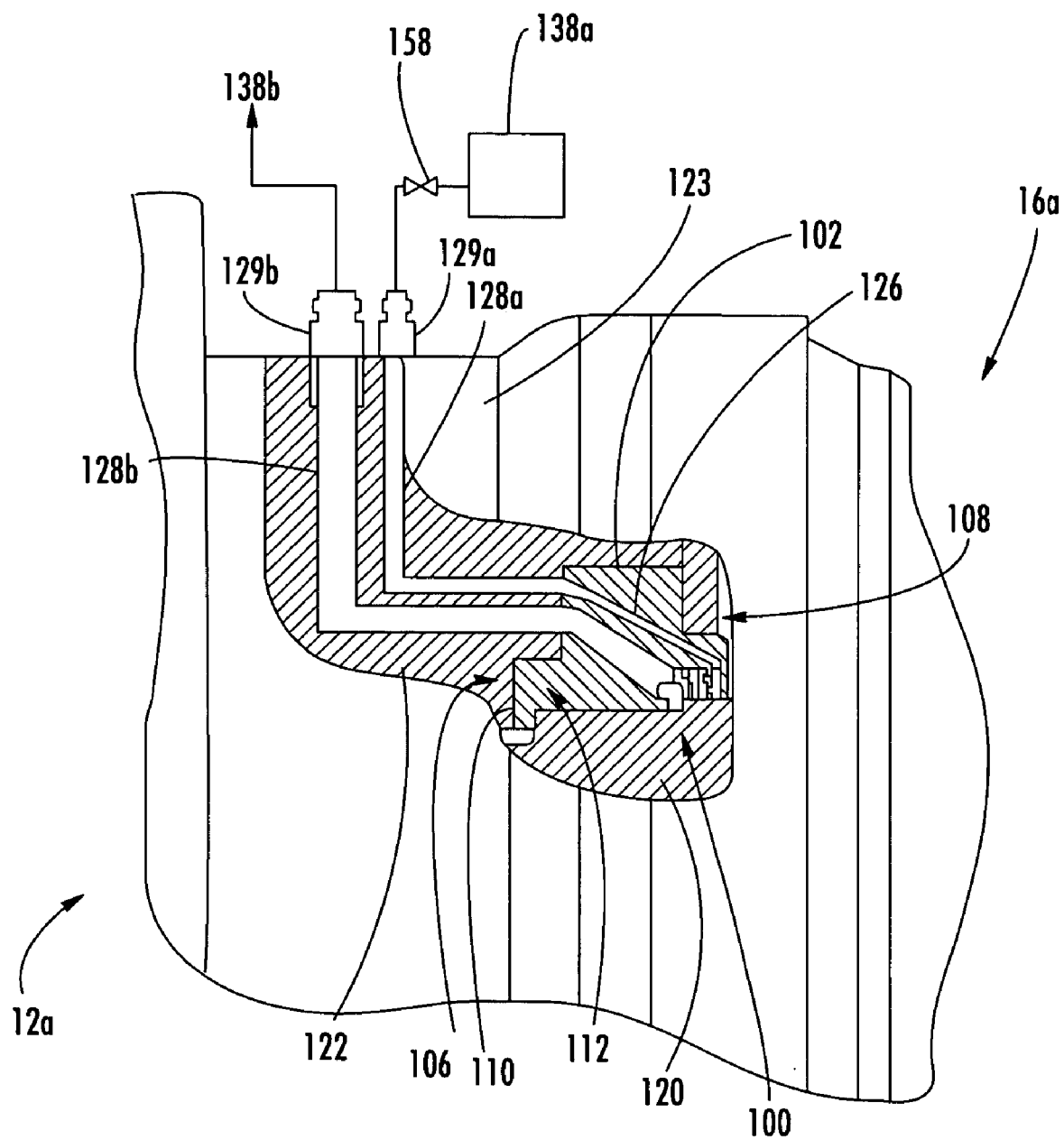
FIG. 2 is a partial cut-away view illustrating a turbopump for a rocket engine, the pump having a seal assembly according to one embodiment of the present invention.
Figure 3:
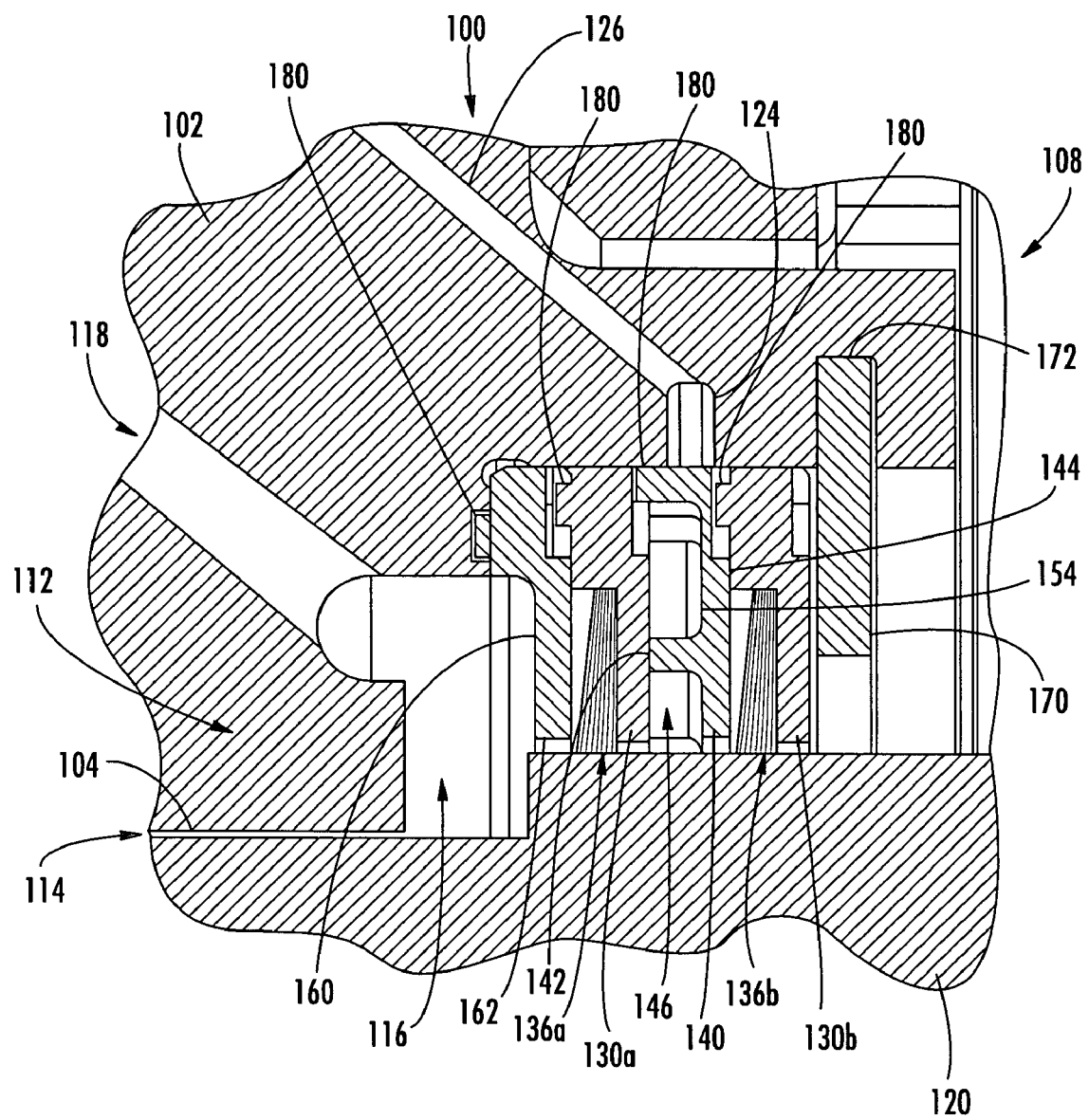
FIG. 3 is a section view illustrating the seal assembly of FIG. 2.

Referring to the drawings and, in particular, to FIGS. 2 and 3, there is illustrated a gas-buffered seal assembly 100 according to one embodiment of the present invention. The seal assembly 100 is used for forming a seal between the pump and turbine portions 12a, 16a of a turbopump for a rocket engine, such as the turbopump 10 illustrated in FIG. 1. Alternatively, the seal assembly 100 can be used in devices for various other applications, such as for forming seals between shafts, housings, or other components that relatively rotate or otherwise move in pumps, engines, turbines, and the like. The seal assembly 100 can be used to controllably seal fluids, such as the cryogenic fluids that are used to chill the turbopump 10 (FIG. 1) and that are pumped thereby. Alternatively, the seal assembly 100 can be used to control the flow of other pumped liquids, lubricants, gases, or other fluids. Further, it is appreciated that the seal assembly 100 is configurable according to the shape, configuration, and design requirements of a device that requires a full or partial fluid seal. Additional sealing apparatuses and methods are provided in U.S. application Ser. No. 10/703,772, titled "Inter-fluid Seal Assembly and Method Therefor," filed concurrently herewith, the entire content of which is herein incorporated by reference.

Figure 4:
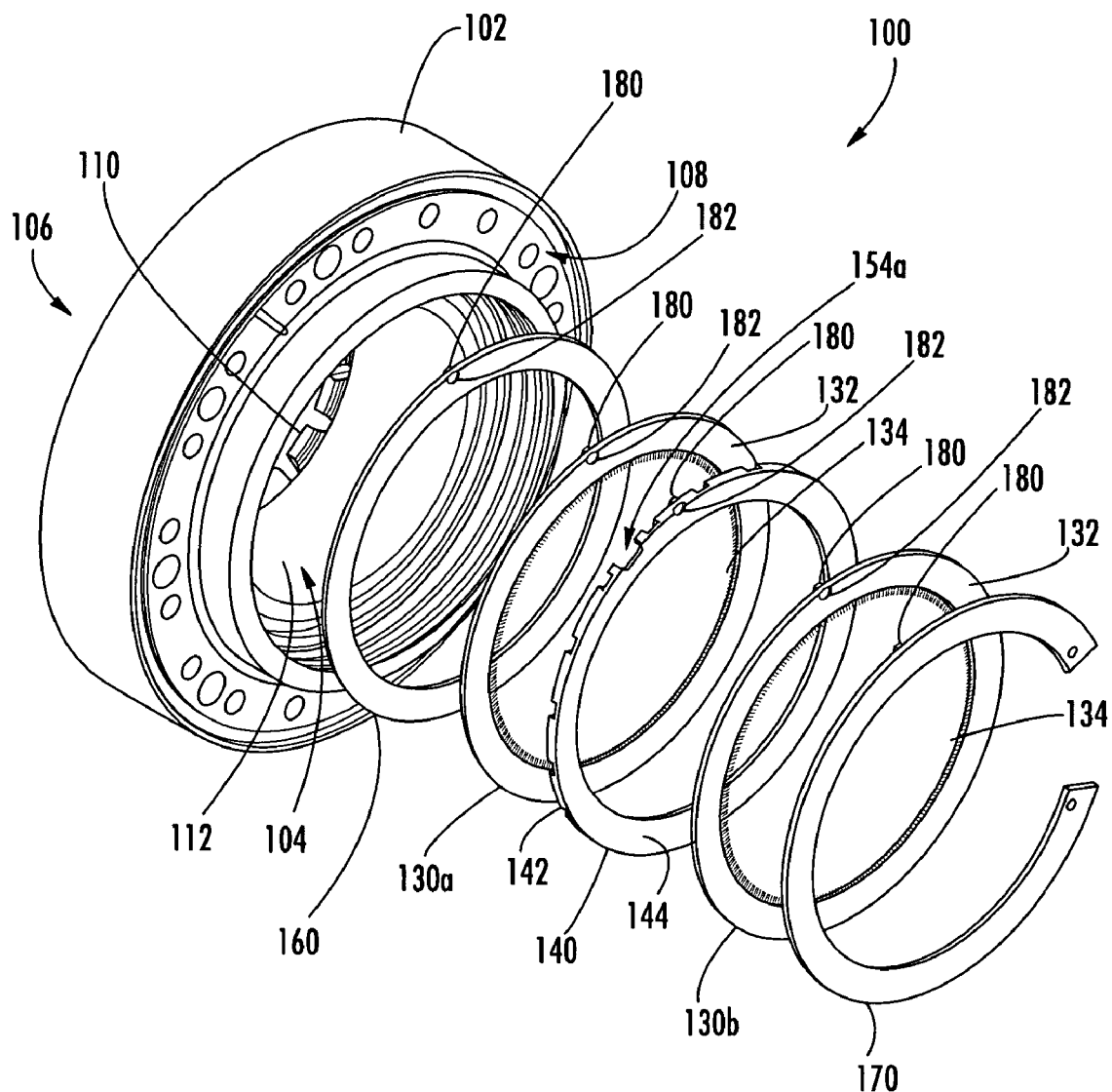
FIG. 4 is an exploded view illustrating the components of the seal assembly of FIG. 2.

The seal assembly 100, which is shown in an unassembled configuration in FIG. 4 for purposes of illustration, includes a seal housing 102 that defines a bore 104 therethrough for receiving a rotatable member 120, such as the shaft 20 of the turbopump 10 that extends between the pump 14 and the turbine 18 of FIG. 1. The seal housing 102 is typically fixedly positioned relative to an outer housing 122 of a turbopump or other device, while the rotatable member 120, which extends in an axial direction through the seal assembly 100, can be rotated. A fluid can be provided on one or both sides 106, 108 of the seal assembly 100, and the seal assembly 100 generally controls the flow of the fluid(s) therebetween. In the embodiment illustrated in FIG. 2, the fluid is provided at the first side 106 of the seal assembly 100, and the assembly controls the flow of the fluid to the second side 108.

At the first side 106 of the seal assembly 100, the seal housing 102 defines a number of radially extending tabs 110 that reduce the rotational flow of the fluid around the rotatable member 120 so that the fluid enters the housing 102 from the first side 106 in a generally axial direction. Further, as shown in FIG. 3, a diameter of the bore 104 through a seal portion 112 of the seal housing 102 is about equal to the diameter of the rotatable member 120 so that the seal portion 112 and the rotatable member 120 define a relatively narrow space 114 therebetween through which fluid can flow. The housing 102 also defines a fluid cavity 116 in fluid communication with the space 114 so that fluid at the first side 106 of the assembly flows axially through the space 114 and into the cavity 116. A drain passage 118 fluidly communicates with the cavity 116 such that fluid in the cavity 116 can be drained from the assembly 100 through the drain passage 118, e.g., to be vented to the environment or to be recirculated for reuse.

At the second side 108 of the seal assembly 100, the bore 104 of the seal housing 102 is structured to receive at least one brush seal 130a, 130b and a dispersion ring 140. In the illustrated embodiment, two brush seals 130a, 130b are provided and configured at opposite sides 142, 144 of the dispersion ring 140. However, in other embodiments of the present invention, the assembly 100 can alternatively include any number of brush seals 130 disposed toward one or both sides 142, 144 of the dispersion ring 140.

Each of the brush seals 130 includes a circumferential member 132 that extends around the rotatable member 120, and a plurality of elongate members 134 that extend radially inward from the circumferential member 132 toward the rotatable member 120. The elongate members 134 can be wires, as are typically used in a wire brush seal. Alternatively, the elongate member 134 can be flexible strips or otherwise shaped members. The members 134 can be formed of stainless steel, other metals, or other materials, depending on the operational characteristics of the seal 100, including the temperature and pressure of the fluid, the operational speed of the rotatable member 120, and the like. Typically, the elongate members 134 are disposed at an angle relative to the radial direction of the brush seals 130a, 130b so that the elongate members 134, which are longer than the distance between the circumferential member 132 and the rotatable member 120, are biased against the rotatable member 120 to form interfaces 136a, 136b with the rotatable member 120. Preferably, the elongate members 134 are angled circumferentially in the same direction as the rotation of the rotatable member 120.

Each of the interfaces 130a, 130b provides a restriction to flow of the fluid, though some fluid can flow through the interfaces 130a, 130b, i.e., between the elongate members 134 or between the elongate members 134 and the rotatable member 120. The restrictive effect of the brush seals 130a, 130b can be increased by providing a pressurized gas to the brush seals 130a, 130b and/or a flow of the gas through the brush seals 130a, 130b, as described further below. Further, the resistance to flow provided by the brush seals 130a, 130b when no pressurized gas is provided can be relatively consistent, e.g., compared to the resistance typically provided by a conventional labyrinth seal. In particular, while the resistance of a labyrinth seal can be affected significantly by the clearance between the labyrinth seal and a shaft or other rotatable member extending therethrough, the brush seals 130a, 130b can provide a relatively consistent resistance due to the flexing of the elongate members 134 to correspond to small variations in diameter of the rotatable member 120.

Figure 5:
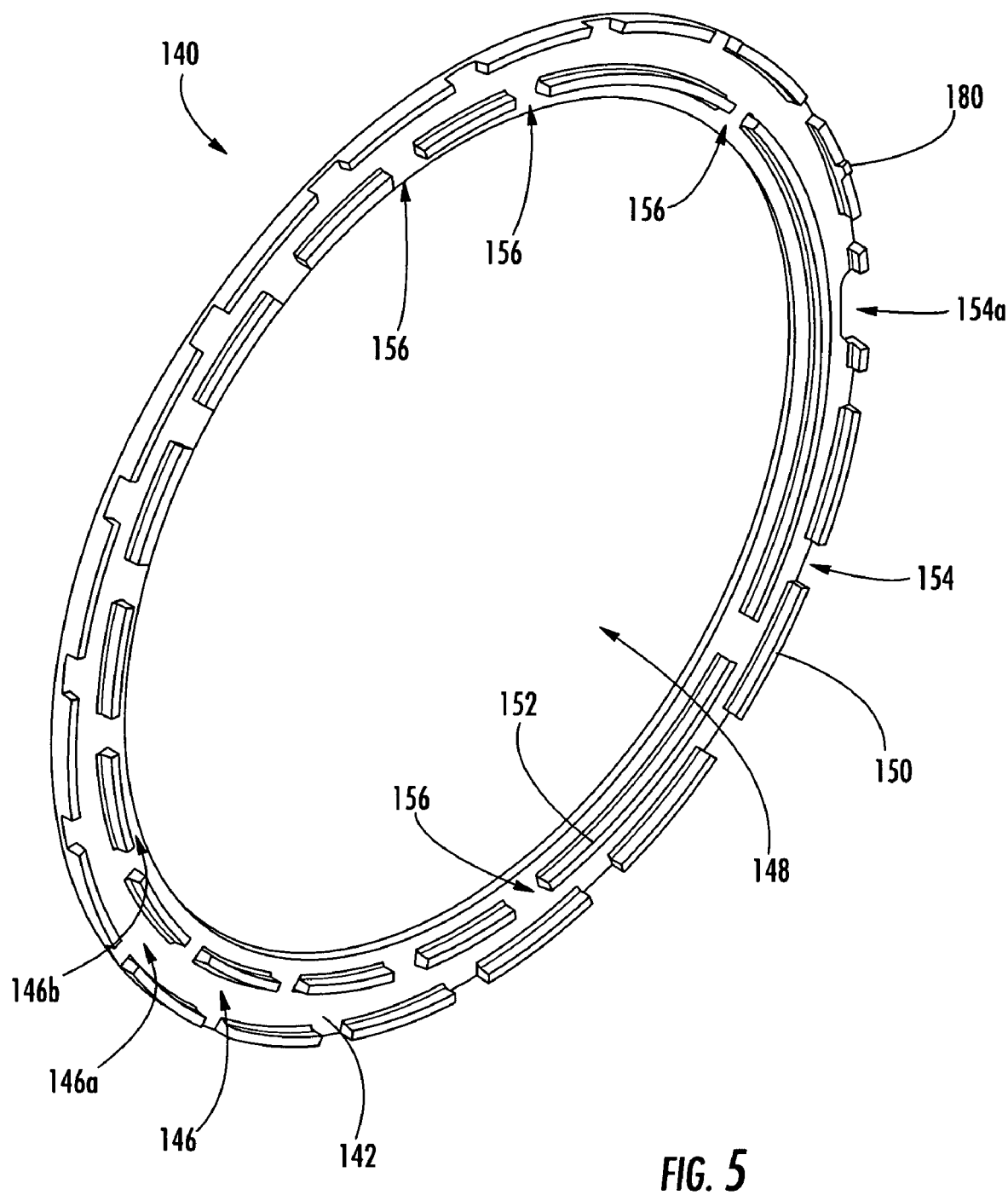
FIG. 5 is a perspective view illustrating the flow dispersion ring of the seal assembly of FIG. 2.
Figure 6:
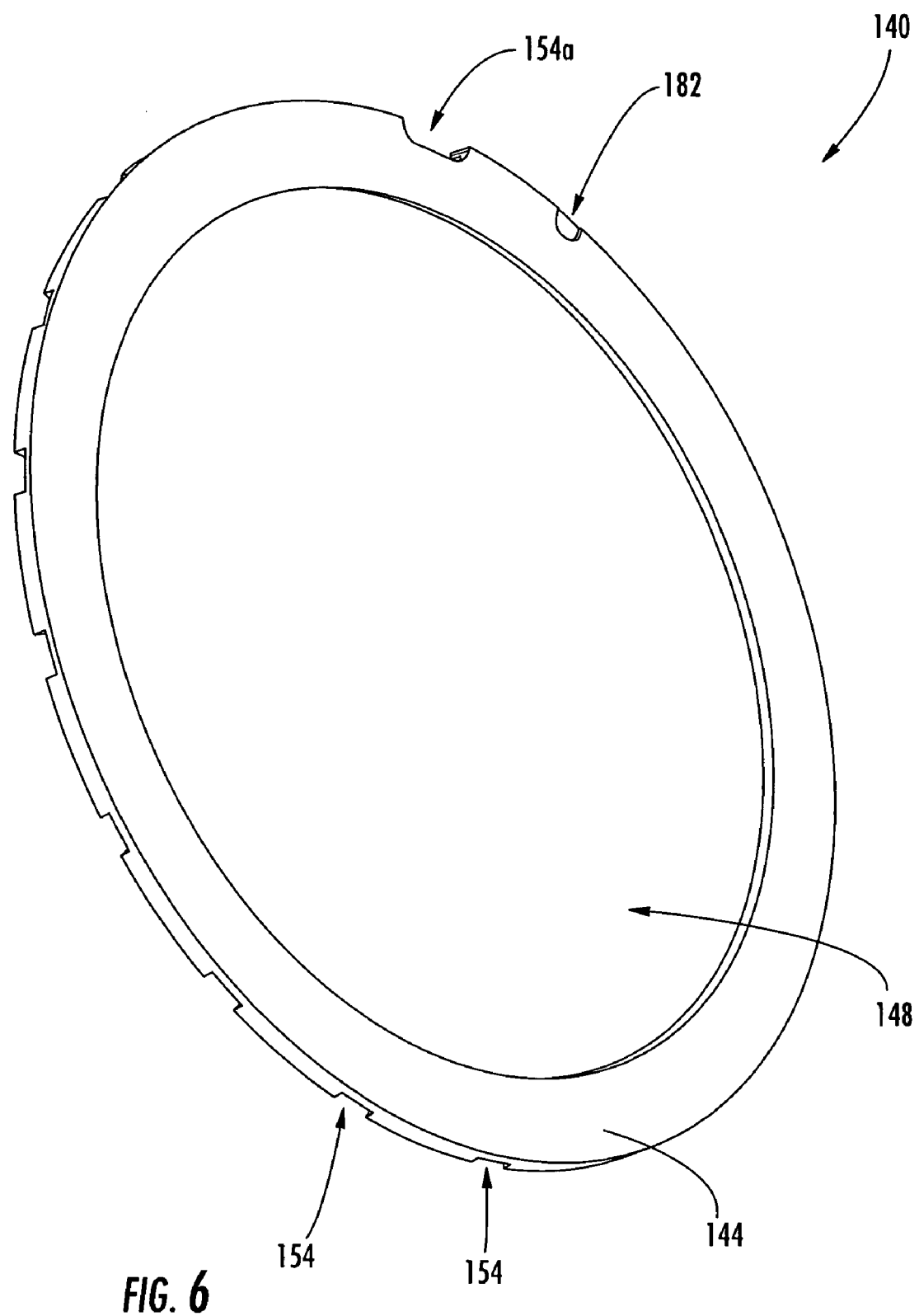
FIG. 6 is another perspective view illustrating the flow dispersion ring of FIG. 5, as seen from the opposite side.

The dispersion ring 140 defines a gas passage 146 configured to receive a gas and circulate the gas through the brush seals 130a, 130b. For example, as illustrated in FIGS. 5 and 6, the dispersion ring 140 defines a bore 148 for receiving the rotatable member 120. The first side 142 of the dispersion ring 140 is directed in the axial direction of the rotatable member 120, and a plurality of wall members 150, 152 extend from the surface. More particularly, a first wall member 150 extends from a first radial position on the first side 142, i.e., at the outermost portion of the side 142. A second wall member 152 extends from a second radial position that is radially inward relative to the first wall member 150. Thus, the side 142 and the first and second wall members 150, 152 define a channel that partially forms the gas passage 146. More particularly, as shown in FIG. 5, the gas passage 146 can define first and second portions 146a, 146b, which are referred to collectively herein by reference numeral 146. As shown in FIG. 3, the first and second wall members 150, 152 extend axially to the brush seal 130a so that the gas passage 146 is defined as a circumferentially extending passage between the side 142 of the dispersion ring 140 and the brush seal 130a. In other embodiments, the dispersion ring 140 can be disposed against a different member other than the brush seal 130a to form the gas passage 146 therebetween, or the dispersion ring 140 can independently define the gas passage 146.

Each of the first and second wall members 150, 152 of the dispersion ring 140 defines a plurality of gaps 154, 156 through which the gas can flow radially. Further, the dispersion ring 140 is disposed proximate to an annular space 124 in the seal housing 102 that extends circumferentially around the dispersion ring 140. The annular space 124 is fluidly connected to a gas inlet 126 that extends through the seal housing 102. In other embodiments of the present invention, multiple gas inlets can be provided through the housing 102, and/or the annular space 124 can extend only partially around the dispersion ring 140. Alternatively, the annular space 124 can be omitted and the gas inlet(s) 126 can extend to define an aperture proximate to the dispersion ring 140, i.e., so that the gas inlets fluidly communicate directly with the gas passage 146 of the dispersion ring 140.

As shown in FIG. 2, the outer housing 122 can define connection passages 128a, 128b for connecting each of the gas inlet 126 and drain passage 118 to respective connectors 129a, 129b on the outer surface 123 of the outer housing 122. Thus, a gas source 138a can be connected to the gas inlet 126 via the connector 129a and the connection passage 128a, and a drain exit 138b can be connected to the drain passage 118 via the connector 129b and the connection passage 128b. The gas source 138a provided for supplying the gas to the inlet 126 can be a storage vessel filled with a pressurized or liquefied gas or a device for pressurizing gas such as a compressor. The gas can be an inert gas such as helium, nitrogen, argon, and the like. Alternatively, the gas can be air, other mixtures of gases, or other gases. Further, a control valve 158 can be disposed between the gas source 138a and the seal assembly 100 such that the control valve 158 can adjust the flow and/or pressure of the gas provided to the seal assembly 100 from the source 138a.

Thus, gas provided by the source 138a can flow through the outer housing 122 and through inlet 126 of the seal housing 102 to the annular space 124. The gas flows circumferentially in the annular space 124 around the dispersion ring 140 and enters the gas passage 146 through the gaps 154 in the first wall member 150. From the gas passage 146, the gas flows through the gaps 156 in the second wall member 152 and then axially to the interfaces 136a, 136b of the brush seals 130a, 130b. Gas flowing through the first brush seal 130a continues to flow axially toward the first side 106 of the assembly 100 and into the cavity 116, from which the gas is drained through the drain passage 118 with the fluid. Gas flowing through the second brush seal 130b continues to flow axially toward the second side 108 of the assembly 100 and therefrom, e.g., to the turbine portion 16 of the turbopump 10.

The gaps 154, 156 in the first and second wall members 150, 152 can be placed uniformly around the circumference of the wall members 150, 152, or the gaps 145, 156 can be placed at nonuniform positions, e.g., so that the gas is provided through the gas passage 146 to have a substantially uniform pressure around the circumference of each interface 136a, 136b. Further, the gaps 154, 156 on one or both of the wall members 150, 152 can have different sizes. For example, as illustrated in FIG. 5, the first wall member 150 defines a relatively large gap, or inlet gap 154a, that is disposed near the inlet 126 of the seal housing 102. The gaps 156 defined by the second wall member can be furthest from one another near the inlet gap 154a and increasingly closer to one another at positions further from the inlet gap 154a. Thus, gas flowing into the first portion 146a of the gas passage 146 through the inlet gap 154a must flow circumferentially in the first portion 146a before encountering a gap 156 in the second wall member 152 and flowing therethrough into the second portion 146b of the passage 146. Similarly, the other gaps 154 in the first wall member 150 can be positioned in a staggered configuration relative the gaps 156 in the second wall member 152 so that gas flowing into the passage 146 must travel circumferentially before flowing though any of the gaps 156 in the second wall member 152. As a result, the gas can be provided at a relatively uniform pressure around the circumference of the brush seals 130a, 130b. It is appreciated that the wall members 150, 152 can be structured in various other configurations to achieve the desired distribution of gas.

Advantageously, the flow of the gas through the interfaces 136a, 136b can substantially entirely prevent the flow of the fluid through the interfaces 136a, 136b. For example, the gas flowing axially through the first brush seal 130a toward the first side 106 of the seal housing 102 opposes the flow of fluid from the first side 106 through the seal assembly 100. In particular, the flow of gas through the first brush seal 130a can prevent fluid from flowing through first brush seal 130a from the first side of the housing 106. Similarly, the flow of gas through the second brush seal 130b can prevent fluid from flowing through the second brush seal in a direction from the second side 108 of the housing 102.

In addition, the flow of gas through the brush seals 130a, 130b can selectively partially prevent the flow of fluid through the seals 130a, 130b. In this regard, the pressure and, hence, the flow rate of the gas can be adjusted to achieve the desired rate of flow of the fluid through the seal assembly 100. In some cases, for example, where it is desired to substantially prevent the flow of the fluid through the seal assembly 100, the gas pressure or flow rate can be increased to a first rate. Alternatively, if some predetermined amount of flow of the fluid through the assembly 100 is desired, the gas pressure and/or gas flow rate can be decreased to a second rate. In some cases, the flow of the gas can be reduced to zero, i.e., the flow of the gas is terminated, so that the seal assembly 100 without the gas provides a desired, albeit lower, resistance to the flow of the fluid, and the desired flow of the fluid through the assembly 100 is achieved. It will be appreciated that the pressure or flow rate of the gas that is required for achieving any particular rate of flow of the fluid through the assembly 100 can depend on the pressure of the fluid at the first side 106 of the assembly 100; the viscosity of the fluid; the pressure at the second side 108 of the assembly 100; the size, number, and configuration of the brush seals 130a, 130b and other components of the seal assembly 100; and the like.

The pressure and/or flow rate of the gas can be adjusted during operation to achieve the desired flow rate of the fluid. For example, the valve 158 can be adjusted manually or automatically, e.g., by an electronic control device that responds to the desired flow rate of the fluid through the assembly 100 according to one or more operational aspects of the device in which the assembly is installed. Thus, the valve 158 can be used to change the flow of gas provided to the brush seals 130a, 130b and, hence, the flow of fluid through the assembly 100. Preferably, the flow of fluid through the seal assembly 100 can be prevented by providing a flow of gas that does not result in gas flowing through the space 114. Further, excessive flow of the gas can be avoided to prevent plastic deformation of the elongate members 134 or otherwise significant parting or other deformation of the elongate members 134.

A backup ring 160 is provided between the cavity 116 and the first brush seal 130a. The backup ring 160 defines a bore 162 that is larger than the diameter of the rotatable member 120 but smaller than an outer an inner diameter of the elongate members 134 such that backup ring 160 provides support to the elongate members 134 and prevents the elongate members 134 from being significantly deformed toward the first side 106 of the seal housing 102 by the flow of gas through the brush seal 130a. While the backup ring 160 is shown as a separate element of the assembly 100, it is appreciated that the backup ring 160 can alternatively be formed as an integral part of one or both of the brush seals 130a, 130b.

In addition, a retaining ring 170 can be provided proximate to the second side 108 of the seal housing 102. The retaining ring 170 can be a c-shaped ring that is elastically reduced in diameter and inserted partially into an annular slot 172 defined by the seal housing 102. The retaining ring 170 is installed in the housing 102 after the brush seals 130a, 130b, dispersion ring 140, and backup ring 160 so that the retaining ring 170 retains the other components 130a, 130b, 140, 160 in the housing 102. In other embodiments of the present invention, other devices or features can be used for retaining the components in the assembly 100 instead of the retaining ring 170. For example, a plate can be used to retain the components in the assembly, or one or more of the components can be connected to the housing 102 by a threaded engagement or other connection features.

Each of the brush seals 130a, 130b, dispersion ring 140, backup ring 160, retaining ring 170, and housing 102 can also define one or more features for engaging the adjacent components. For example, each of the backup ring 160, brush seals 130a, 130b, dispersion ring 140, and retaining ring 160 can define a tab 180 extending axially in the direction of the first side 106. The housing 102, backup ring 160, brush seals 130a, 130b, and dispersion ring 140 can define pockets 182 directed toward the second side 108 and corresponding in size and location to the tabs 180 of the adjacent components such that the components 102, 130a, 130b, 140, 160, 170 engage one another, thereby preventing relative rotation of the components that might otherwise result from the rotation of the rotatable member 120 and/or rotational flow of the fluid.

Figure 7:
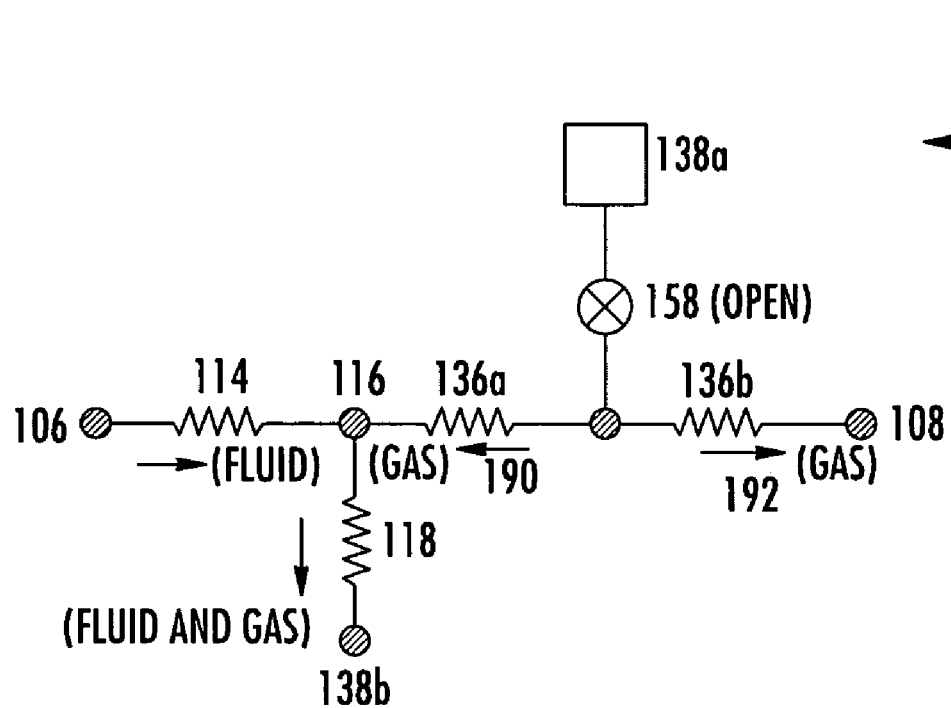
FIG. 7 is a schematic view illustrating the operation of the gas seal of FIG. 2 in a first mode of operation.

Referring to FIG. 7, there is shown a schematic view illustrating the flow of the fluid and gas through the seal assembly 100 when the gas is circulated through the seal assembly 100. Each of the elements of the seal assembly 100 is indicated to have a resistive effect on the flow of the gas and the fluid. As shown, the fluid at the first side 106 of the seal assembly 100 flows axially through the space 114 proximate the rotatable member 120 and into the cavity 116. The gas enters the seal assembly 100 through the valve 158 and flows therefrom in opposite axial directions 190, 192. Gas flowing in direction 190 toward the first side 106 of the assembly 100 flows through the interface 136a provided by the first brush seal 130a, thereby preventing the flow of the fluid therethrough. The gas flows from the interface 136a into the cavity 116, and from the cavity 116 the gas and fluid exit the seal assembly 100 through the drain passage 118. The gas flowing in the opposite axial direction 192 flows through the second interface 136b provided by the second brush seal 130b and exits the second side 108 of the assembly 100.

Figure 8:
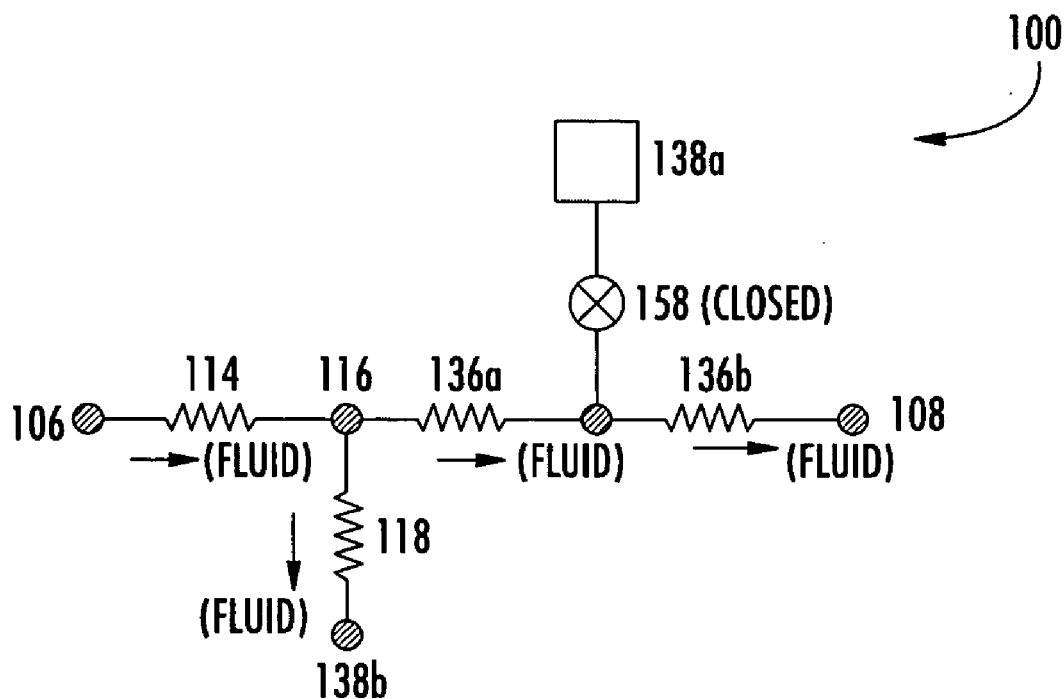
FIG. 8 is a schematic view illustrating the operation of the gas seal of FIG. 2 in a second mode of operation.

Alternatively, when the control valve 158 is closed, as shown in FIG. 8, the gas does not enter the gas passage 146.

Thus, the pressurized fluid at the first side 106 of the housing 102 enters the seal assembly 100 through the first side 106 and flows into the cavity 116. Some of the fluid flows from the cavity 116 through the first interface 136a through the second interface 136b, and then through the second side 108 of the assembly 100. The remaining fluid in the cavity 116 flows through the drain passage 118 and exits the seal assembly 100.

If the seal assembly 100 is used in a turbopump, the fluid can be a cryogenic fluid that is circulated through the pump portion in the pre-operation chilling process and is pumped by the pump during operation of the turbopump. The control valve 158 can be opened during the pre-operation chilling process so that the fluid does not enter the turbine portion of the turbopump. Thereafter, when operation of the turbopump is initiated, the control valve 158 can be partially or fully closed so that the fluid flows according to a predetermined rate into the turbine portion, thereby cooling the turbine. Alternatively, the seal assembly can be used in other devices for controlling the flow of fluids, including lubricant, coolants, or other liquids and/or gases.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A gas-buffered brush seal assembly for controlling the flow of a fluid adjacent a rotatable member, the seal assembly comprising:
    at least one brush seal having a circumferential member and a plurality of elongate members, the circumferential member structured to extend circumferentially around the rotatable member and the elongate members being connected to the circumferential member and structured to extend generally radially inward to define an interface with the rotatable member; and
    a dispersion ring defining a bore for receiving the rotatable member therethrough and defining a gas passage extending at least partially circumferentially around the bore of the dispersion ring, the dispersion ring being disposed adjacent the at least one brush seal such that the gas passage of the dispersion ring is configured to receive a gas, communicate the gas therethrough, and deliver the gas to the interface of the elongate members and the rotatable member such that the gas at least partially prevents the flow of fluid through the interface,
    wherein the seal assembly is configured to operate in first and second modes, the first mode being characterized by the gas being delivered at a first flow rate such that the fluid flows through the interface according to a first predetermined rate, and the second mode being characterized by the gas being delivered at a second flow rate less than the first flow rate such that the fluid flaws through the interface according to a second predetermined rate, the second predetermined rate being greater than the first predetermined rate.

2. A seal assembly according to claim 1 wherein the second mode is characterized by the flow of the fluid occurring according to the second predetermined rate when no gas is delivered through the gas passage.

3. A seal assembly according to claim 1 wherein the first mode is characterized by the flow of the fluid being prevented from flowing through the interface such that the first predetermined rate is zero.

4. A seal assembly according to claim 1 further comprising at least two brush seals, the brush seals being configured on opposite sides of the dispersion ring.

5. A seal assembly according to claim 1 wherein the dispersion ring defines a surface directed in the axial direction of the rotatable member and at least one wall member extending from the surface and extending circumferentially around at least a portion of the bore in the dispersion ring, the surface and at least one wall defining the gas passage.

6. A seal assembly according to claim 5 wherein the dispersion ring defines a first wall member at a first radial position on the surface and a second wall member at a second radial position on the surface radially inward of the first wall member, the first wall member defining at least one gap for radial flow of the gas into the gas passage and the second wall member defining at least one gap for radial flow of the gas radially inward from the gas passage.

7. A seal assembly according to claim 1 wherein the dispersion ring is configured to deliver the gas to the interface at a substantially uniform pressure.

8. A seal assembly according to claim 1 further comprising a housing defining a bore for receiving the dispersion ring, the at least one brush seal, and the rotatable member in an axial direction therethrough, the housing defining a gas inlet and an annular space extending circumferentially around the bore and proximate to the dispersion ring, the annular space being fluidly connected to the gas inlet such that the annular space is configured to receive the gas from the gas inlet end deliver the gas to the dispersion ring.

9. A seal assembly according to claim 8 wherein the housing defines a drain for receiving at least one of the fluid and the gas.

10. A seal assembly according to claim 1 further comprising a backup ring disposed opposite the at least one brush seal from the dispersion ring, the backup ring being structured to restrict the axial deformation of at least some of the elongate members.

11. A seal assembly according to claim 1 wherein the at least one brush seal and the dispersion ring are structured to be engaged to prevent relative rotation therebetween.

12. A seal assembly according to claim 1 wherein the elongate members of the at least one brush seal are wire members extending generally radially inward from the circumferentially member.

13. A gas-buffered brush seal assembly for controlling the flow of
    a fluid adjacent a rotatable member, the seal assembly comprising:
    a housing defining a bore for receiving the rotatable member extending in an axial direction therethrough, the housing defining a gas inlet;
    a dispersion ring disposed in the housing, the dispersion ring defining a bore for receiving the rotatable member therethrough and defining a gas passage extending at least partially circumferentially around the bore of the dispersion ring, the gas passage being in fluid communication with the gas inlet of the housing;
    at least one brush seal disposed in the housing, each brush seal having a circumferential member and a plurality of elongate members, the circumferential member structured to extend circumferentially around the rotatable member and the elongate members being connected to the circumferential member and structured to extend generally radially inward to define a flow restricting interface with the rotatable member;

wherein the dispersion ring is configured to receive a gas from the inlet of the housing, communicate the gas through the gas passage, and deliver the gas to and through an interface between the elongate members and the rotatable member such that the gas at least partially prevents the flow of fluid through the seal assembly at the interface, and wherein the seal assembly is configured to operate in first and second modes, the first mode being characterized by the gas being delivered at a first flow rate such that flow of the fluid through the interface is substantially entirely prevented, and the second mode being characterized by the gas being delivered at a second flow rate less than the first flow rate such that flow of the fluid through the interface occurs according to a predetermined rate.

14. A seal assembly according to claim 13 wherein each brush seal is disposed in substantially nonrotatable communication with the housing such that the rotatable member rotates relative to each brush seal.

15. A seal assembly according to claim 13 wherein the second mode is characterized by the flow of the fluid occurring at the second flow rate when no gas is delivered.

16. A seal assembly according to claim 13 further comprising at least two brush seals, the brush seals being configured on opposite sides of the dispersion ring.

17. A seal assembly according to claim 13 wherein the dispersion ring defines a surface directed in the axial direction of the rotatable member and at least one wall member extending from the surface and extending circumferentially around at least a portion of the bore in the dispersion ring, the surface and at least one wall defining the gas passage.

18. A seal assembly according to claim 17 wherein the dispersion ring defines a first wall member at a first radial position on the surface and a second wall member at a second radial position on the surface radially inward of the first wall member, the first wall member defining at least one gap for radial flow of the gas into the gas passage and the second wall member defining at least one gap for radial flow of the gas radially inward from the gas passage.

19. A seal assembly according to claim 13 wherein the dispersion ring is configured to deliver the gas to the interface at a substantially uniform pressure.

20. A seal assembly according to claim 13 wherein the housing defines an annular space extending circumferentially around the bore and proximate to the dispersion ring, the annular space being fluidly connected to the gas inlet such that the annular space is configured to receive the gas from the gas inlet and deliver the gas to the dispersion ring.

21. A seal assembly according to claim 13 further comprising a backup ring disposed opposite the at least one brush seal from the dispersion ring, the backup ring structured to restrict the axial deformation of at least some of the elongate members.

22. A seal assembly according to claim 13 wherein the housing defines a drain for receiving at least one of the fluid and the gas.

23. A seal assembly according to claim 13 wherein the at least one brush seal and the dispersion ring are structured to be engaged to prevent relative rotation therebetween.

24. A seal assembly according to claim 13 wherein the elongate members of the at least one brush seal are wire members extending generally radially inward from the circumferential member.

25. A method for controlling a flow of a fluid through a seal assembly extending circumferentially around a rotatable member, the method comprising:

selectively circulating a gas in first and second modes of operation through a gas passage extending at least partially circumferentially around the rotatable member, the first mode being characterized by the gas flowing at a first flow rate through the gas passage and axially through at least one interface formed between the rotatable member and at least one brush seal, the second mode being characterized by the gas flowing at a second flow rate through the gas passage and axially through the at least one interface, wherein the flow of the fluid through the interface is restricted during the first mode according to a first predetermined rate, and the flow of the fluid through the interface is restricted during the second mode according to a second predetermined rate, the first flow rate of the gas through the gas passage being greater than the second flow rate of the gas such that the first predetermined rate of the fluid through the interface is less than the second predetermined rate of the fluid.

26. A method according to claim 25 further comprising selectively terminating the circulation of the gas through the gas passage during the second mode such that the flow of the fluid through the interface during the second mode occurs according to the second predetermined rate.

27. A method according to claim 25 wherein said circulating step comprises circulating the gas at the first flow rate, the first flow rate being sufficiently high to terminate the circulation of the fluid through the interface during the first mode such that the first predetermined rate of the fluid is zero.

28. A method according to claim 25 further comprising providing first and second brush seals on opposite sides of the gas passage such that the brush seals define opposite interfaces, and wherein said circulating step comprises circulating the gas in opposite axial directions through the first and second brush seals.

29. A method according to claim 25 wherein said circulating step comprises circulating the gas radially inward into a dispersion ring defining the gas passage, circumferentially through the gas passage of the dispersion ring, and thereafter axially through the interface of the at least one brush seal.

30. A method according to claim 25 wherein said circulating step comprises delivering the gas to the interface at a substantially uniform pressure.

31. A method according to claim 25 further comprising providing a housing defining a bore for receiving the at least one brush seal, and wherein said circulating step comprises circulating the gas through an inlet defined by the housing.

32. A method according to claim 31 wherein said circulating step comprises circulating the gas through an annular space defined by the housing, the annular space extending circumferentially around the gas passage.

33. A method according to claim 25 wherein said circulating step comprises draining at least one of the fluid and the gas through the housing.

* * * * *

UNITED STATES PATENT AND TRADEMARK OFFICE
CERTIFICATE OF CORRECTION

PATENT NO. : 6,991,235 B2  Page 1 of 1,
DATED : January 31, 2006
INVENTOR(S) : Ebert et al.

It is certified that error appears in the above-identified patent and that said Letters Patent is hereby corrected as shown below:

<u>Column 9,</u>
Line 62, "flaws" should read -- flows --.

<u>Column 10,</u>
Line 35, "end" should read -- and --.

Signed and Sealed this

Sixth Day of June, 2006

JON W. DUDAS
*Director of the United States Patent and Trademark Office*